United States Patent
Gloege et al.

(10) Patent No.: US 8,301,939 B2
(45) Date of Patent: Oct. 30, 2012

(54) REDUNDANT DATA PATH

(75) Inventors: Chad N. Gloege, Brookings, SD (US); Matthew R. Mueller, Brookings, SD (US); Neil R. Burghardt, Brookings, SD (US); Brett D. Wendler, Watertown, SD (US)

(73) Assignee: Daktronics, Inc., Brookings, SD (US)

( * ) Notice: Subject to any disclaimer, the term of this patent is extended or adjusted under 35 U.S.C. 154(b) by 546 days.

(21) Appl. No.: 11/805,512

(22) Filed: May 23, 2007

(65) Prior Publication Data

US 2009/0024867 A1    Jan. 22, 2009

Related U.S. Application Data

(60) Provisional application No. 60/808,212, filed on May 24, 2006.

(51) Int. Cl.
   *G06F 11/00* (2006.01)
(52) U.S. Cl. .................. 714/43; 714/3; 714/11
(58) Field of Classification Search ............... 714/3, 11, 714/43
   See application file for complete search history.

(56) References Cited

U.S. PATENT DOCUMENTS

| | | | | |
|---|---|---|---|---|
| 5,523,769 | A * | 6/1996 | Lauer et al. | 345/1.3 |
| 5,726,668 | A * | 3/1998 | Clement | 715/723 |
| 5,739,803 | A * | 4/1998 | Neugebauer | 345/98 |
| 5,812,106 | A * | 9/1998 | Hughes | 345/90 |
| 5,844,373 | A * | 12/1998 | Yao et al. | 315/205 |
| 5,892,504 | A * | 4/1999 | Knapp | 345/204 |
| 6,038,682 | A | 3/2000 | Norman | |
| 6,232,939 | B1 * | 5/2001 | Saito et al. | 345/93 |
| 6,725,442 | B1 * | 4/2004 | Cote et al. | 716/126 |
| 6,822,624 | B2 * | 11/2004 | Naimer et al. | 345/9 |
| 6,844,865 | B2 * | 1/2005 | Stasko | 345/1.3 |
| 6,987,448 | B2 * | 1/2006 | Catton et al. | 340/506 |
| 6,999,045 | B2 * | 2/2006 | Cok | 345/1.3 |
| 7,166,967 | B2 * | 1/2007 | Cho et al. | 315/169.3 |
| 7,492,377 | B2 * | 2/2009 | Edwards et al. | 345/694 |
| 2001/0033277 | A1 * | 10/2001 | Sandoe et al. | 345/204 |
| 2003/0160781 | A1 * | 8/2003 | Berndt et al. | 345/419 |
| 2004/0066411 | A1 * | 4/2004 | Fung et al. | 345/781 |

(Continued)

FOREIGN PATENT DOCUMENTS

EP    1246052 A1    10/2002

OTHER PUBLICATIONS

"European Application Serial. No. 08165442.8, European Search Report dated on Nov. 28, 2008", 7 pgs.

*Primary Examiner* — Scott Baderman
*Assistant Examiner* — Loan L. T. Truong
(74) *Attorney, Agent, or Firm* — Schwegman, Lundberg & Woessner, P.A.

(57) ABSTRACT

Disclosed are redundant data path(s) for transmission of graphical data between components in a graphical display system. The redundant data path(s) are used to transmit graphical data by at least two independent means, so that if a failure in one data path occurs, a data transmitted via a separate data path can be used for display. The system is particularly advantageous for multiple-serial-module configurations. The redundant data path(s) minimize disruption of data display and make repair and maintenance of the display system more efficient. The invention includes apparatus for graphical display systems, and also includes methods of data transmission for graphical display systems, and methods of maintenance of graphical display systems.

19 Claims, 7 Drawing Sheets

U.S. PATENT DOCUMENTS

| | | |
|---|---|---|
| 2004/0239668 A1* | 12/2004 | Morosawa et al. ............ 345/212 |
| 2005/0012689 A1* | 1/2005 | Abdoulin ......................... 345/60 |
| 2005/0057440 A1* | 3/2005 | Naimer et al. ..................... 345/8 |
| 2005/0065669 A1* | 3/2005 | Roux et al. ......................... 701/3 |
| 2005/0243212 A1* | 11/2005 | Onomatsu et al. ............ 348/581 |
| 2006/0109226 A1* | 5/2006 | Tyrrell et al. ................... 345/98 |
| 2006/0227085 A1* | 10/2006 | Boldt et al. ..................... 345/83 |
| 2006/0248475 A1* | 11/2006 | Abrahamsson ............... 715/835 |
| 2007/0084978 A1* | 4/2007 | Martin et al. .............. 248/176.1 |
| 2007/0103384 A1* | 5/2007 | Hsieh et al. .................... 345/1.1 |
| 2007/0205974 A1* | 9/2007 | Iizuka et al. ..................... 345/98 |
| 2007/0222642 A1 | 9/2007 | Hedrick |
| 2007/0222778 A1* | 9/2007 | Bryant .......................... 345/207 |
| 2007/0233655 A1* | 10/2007 | Engels ............................... 707/3 |
| 2009/0024867 A1* | 1/2009 | Gloege et al. ..................... 714/3 |
| 2009/0153529 A1* | 6/2009 | Masuda ........................ 345/204 |
| 2009/0262062 A1* | 10/2009 | Ochiai .......................... 345/102 |

* cited by examiner

REDUNDANT DATA PATH

CROSS REFERENCES TO RELATED APPLICATIONS

This application claims benefit from the earlier filed U.S. Provisional Application No. 60/808,212 entitled "Redundant Data Path" filed May 24, 2006, and is hereby incorporated into this application by reference as if fully set forth herein.

BACKGROUND OF THE INVENTION

1. Field of the Invention

The present invention relates to graphical display systems, which may include large video displays, signage, tickers, and the like. Particularly, the present invention relates to transfer of graphical data to the graphical displays. More particularly, the present invention relates to apparatus and methods for transfer of graphical data to graphical displays, the present invention providing more effective data transfer which is more resistant to failures, and which provides more efficient and more economical operation of such graphical display systems.

2. Description of the Prior Art

Electronic display systems typically transmit information, including graphical data, from a control unit to the graphical display, such as by electrical connection from the output jacks of the control unit to the input jacks on the individual graphical display modules or panels. Traditionally, as information is transmitted through the signal cables, it travels on only a single medium, and although multiple conductors may be used, the complete signal must reach the graphical display module or panel for the information to be displayed correctly. Typically, a number of graphical display modules or panels are connected in series, with the signal passed from one module to the next. While this system is sufficient when all equipment works correctly, it causes multiple problems when equipment fails. For example, if a signal fails on the first module of a display, every module connected after that module could receive a corrupted signal or no signal at all, causing a significant section of the display to become blank or show incorrect data. Such a failure then requires a technician to access the display and change the faulty signal cable or component to enable the equipment to return to working order.

While this failure and repair is an annoyance for displays in a commercial application, such as a Las Vegas casino or a roadside display, this can seriously affect other applications, such as a high profile event, a live concert, or a major league game.

The present invention overcomes these shortcomings of the prior art.

SUMMARY OF THE INVENTION

The general purpose of the present invention is to provide enhanced data transfer to graphical displays, modules, and panels.

The present invention is a redundant data path that is used to send a signal by at least two physically separate means to an electronic display module or panel. By doing so, the redundant data path enhances the reliability of the graphical display system. If a primary signal fails or a primary signal path is damaged, a secondary signal continues delivering information to the remaining modules or panels, substantially seamlessly so there is no significant disruption of display.

According to one embodiment of the present invention, there is provided apparatus for redundant data paths for graphical data transfer to graphical displays, modules, and panels.

According to another embodiment of the present invention, there is provided a method of providing data to graphical displays, modules, and panels.

One significant aspect and feature of the present invention is multiple data paths.

Another significant aspect and feature of the present invention is bidirectional data paths.

Still another significant aspect and feature of the present invention is data path diagnostics.

Yet another significant aspect and feature of the present invention is data path switching.

A further significant aspect and feature of the present invention is utilizing redundant data paths to provide enhanced graphical system utility and function.

A still further significant aspect and feature of the present invention is utilizing redundant data paths to provide cost-effective repair and maintenance of a graphical display system.

Yet a further significant aspect and feature of the present invention is seamless graphical display function during data path or module failure.

Having thus described embodiments of the present invention and set forth significant aspects and features of the present invention, it is the principal object of the present invention to provide data delivery for graphical display systems, with enhanced reliability and efficiency.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is a redundant data path that is used to send a signal by at least two physically separate means to an electronic display module or panel. By doing so, the redundant data path reduces the chances for display downtime. If a first data path fails or is damaged and does not properly transmit graphical data to a first display component, the display component utilizes graphical data transmitted via one or more alternate data paths in as seamless a manner as possible to eliminate or minimize disruption of data display, and the appropriate graphical data can be in turn transmitted from the first display component to other display modules, panels, or components.

The redundant data path enhances reliability of the display system, so that a single failure of a wire, cable, wireless transmission, power supply or transmission, display module, or panel will have minimal or no visible effect on the display of graphical information and therefore little or no disruption of any sporting event, concert, and so forth, depending on the particular use of the display station.

In addition, the redundant data path provides for more efficient maintenance. First, any maintenance or repair could be delayed either until a particular event was completed and the display was not being used, or until a scheduled maintenance time, since isolated failures cause little or no disruption to the display of graphical data. Second, certain types of isolated failures would cause only a particular failed module or panel to be blank rather than a large portion of a display or the entire display as might otherwise occur, and any repairs could be directed to the particular failed module or panel without requiring as much troubleshooting effort. In addition the costs of such repair and maintenance, and the overall cost-effectiveness of the graphical display system, is enhanced over the prior art.

Electronic display systems typically transmit information, including graphical data, from the control unit to the graphical display, such as by electrical connection from the output jacks of the control unit to the input jacks on the individual graphical display modules or panels.

Figure 1:
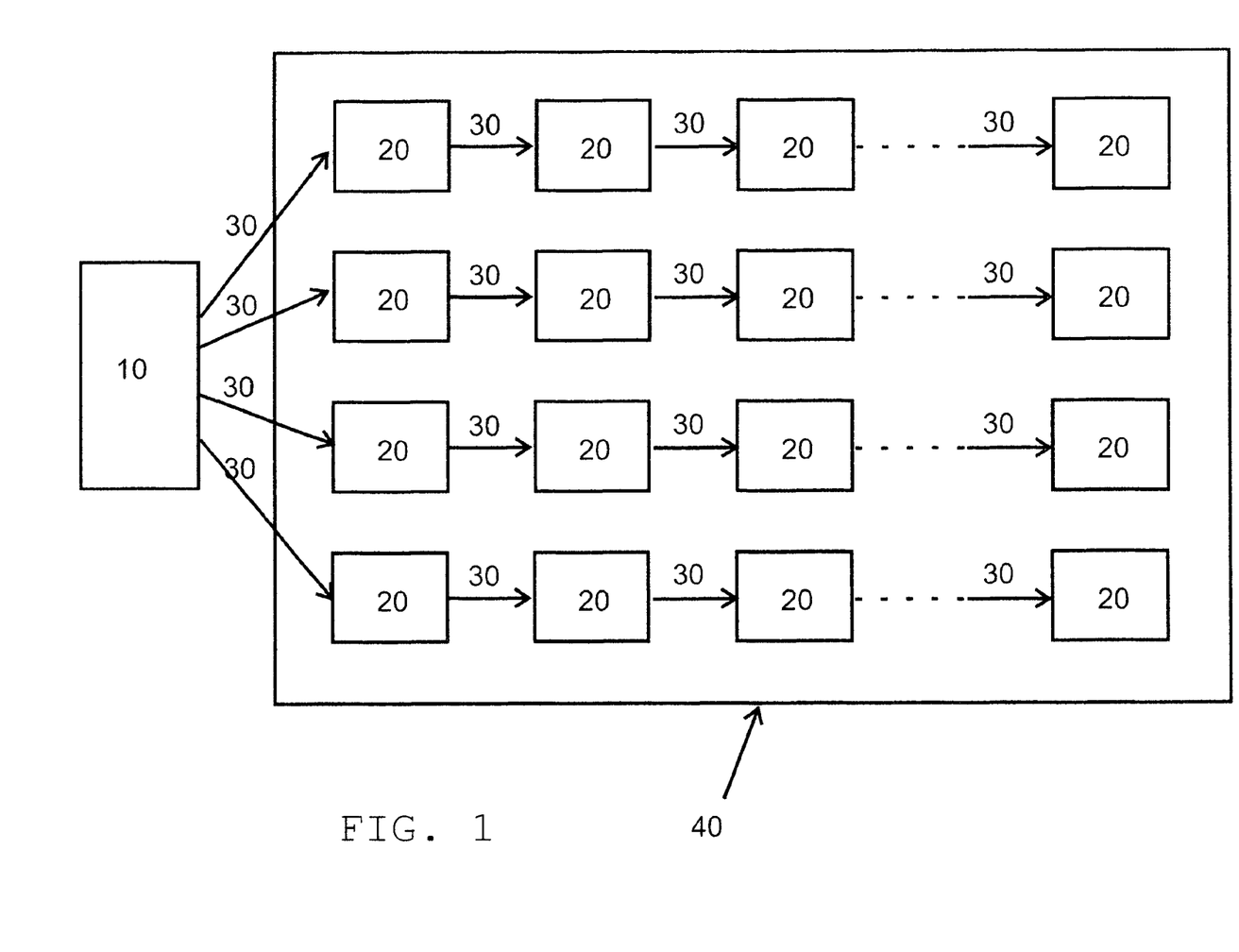
FIG. 1 is a schematic signal routing diagram for conventional arrangement with conventional data paths.

Traditionally, as information is transmitted through the signal cables, it travels on only a single medium, and although multiple conductors may be used, the complete signal must reach the graphical display module or panel for the information to be displayed correctly. Typically, a number of graphical display modules or panels are connected in series, with the signal passed from one module to the next. FIG. 1 illustrates a typical prior art arrangement, with graphical data from a control unit or data distributor 10 being transmitted along unidirectional data paths 30 to the various display modules or panels 20 in the display 40. There may be multiple data paths from the control unit or data distributor 10, but typically a number of display modules or panels 20 are connected in series along each data path 30 as indicated. While this system is sufficient when all equipment works correctly, it causes multiple problems when equipment fails. For example, if a signal fails on the first display module or panel 20 of a display 40, every module connected in series after that module could receive a corrupted signal or no signal at all, causing a significant section of the display to become blank or show incorrect data.

Figure 2:
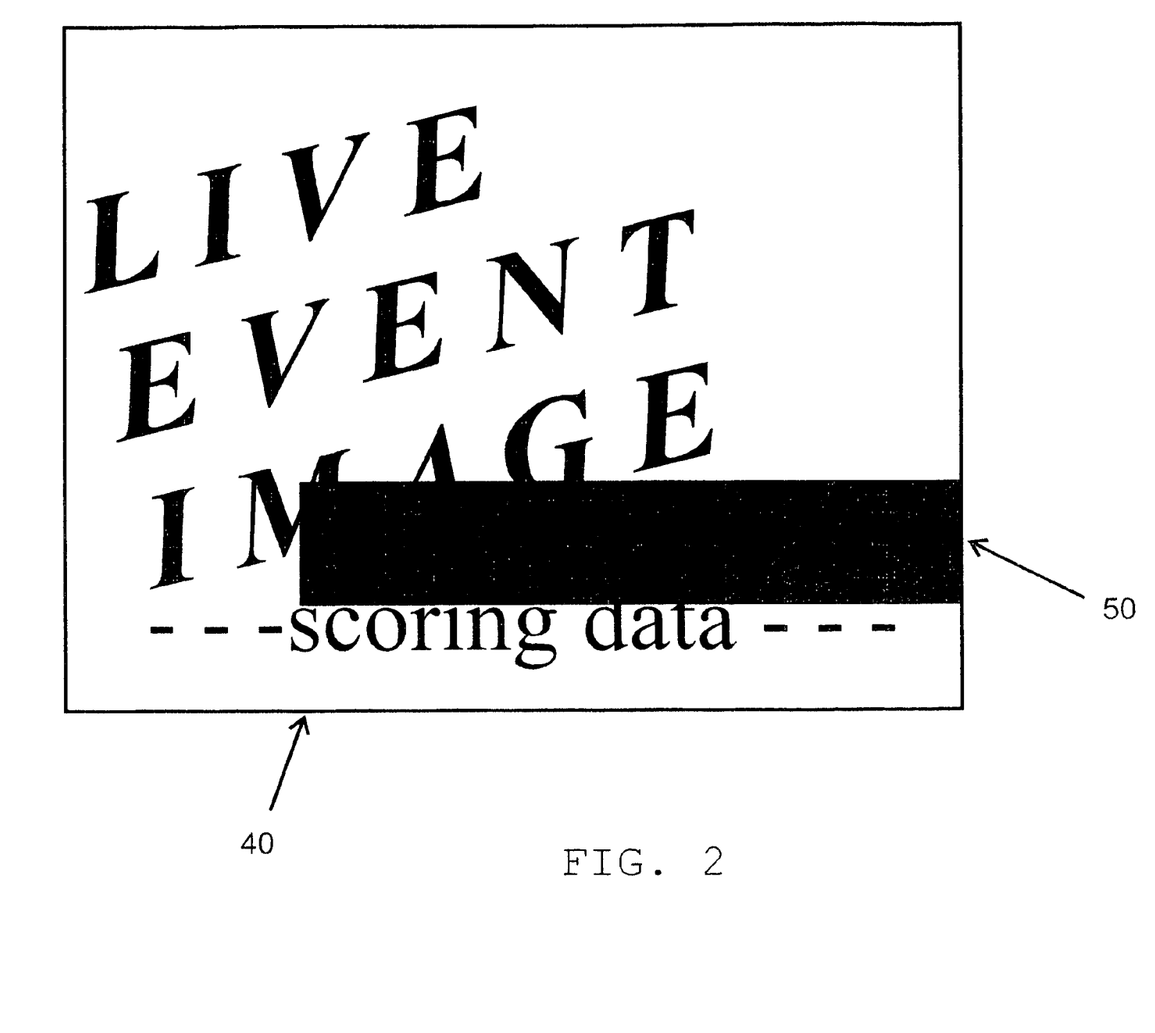
FIG. 2 is a conventional LED display with conventional data path routing, with a signal or power failure.

FIG. 2 illustrates a conventional display 40 in which a single failure in a particular data path 30 causes a display module or panel 20 to display incorrectly or be blank, but also causes other downstream display modules or panels 20 to display incorrectly or be blank, resulting in a significant and disruptive failure of the display, as illustrated in FIG. 2. This failure can therefore result in a major disruption, depending on which modules are affected; a major portion of a video display, or scoring information, etc., could be blank. FIG. 2 shows a significant band of defective display 50, but depending on the particular wiring configuration, a smaller or larger portion of the display could be affected, including the entire display (if the data path was serial for the entire display and the first portion had the failure). Such a failure then requires a technician to access the display and change the faulty signal cable or component to enable the equipment to return to working order.

While repair is an annoyance for displays in a commercial application, such as a Las Vegas casino or a roadside display, this can seriously affect other applications, such as a high profile event, a live concert, or a major league game.

Figure 3:
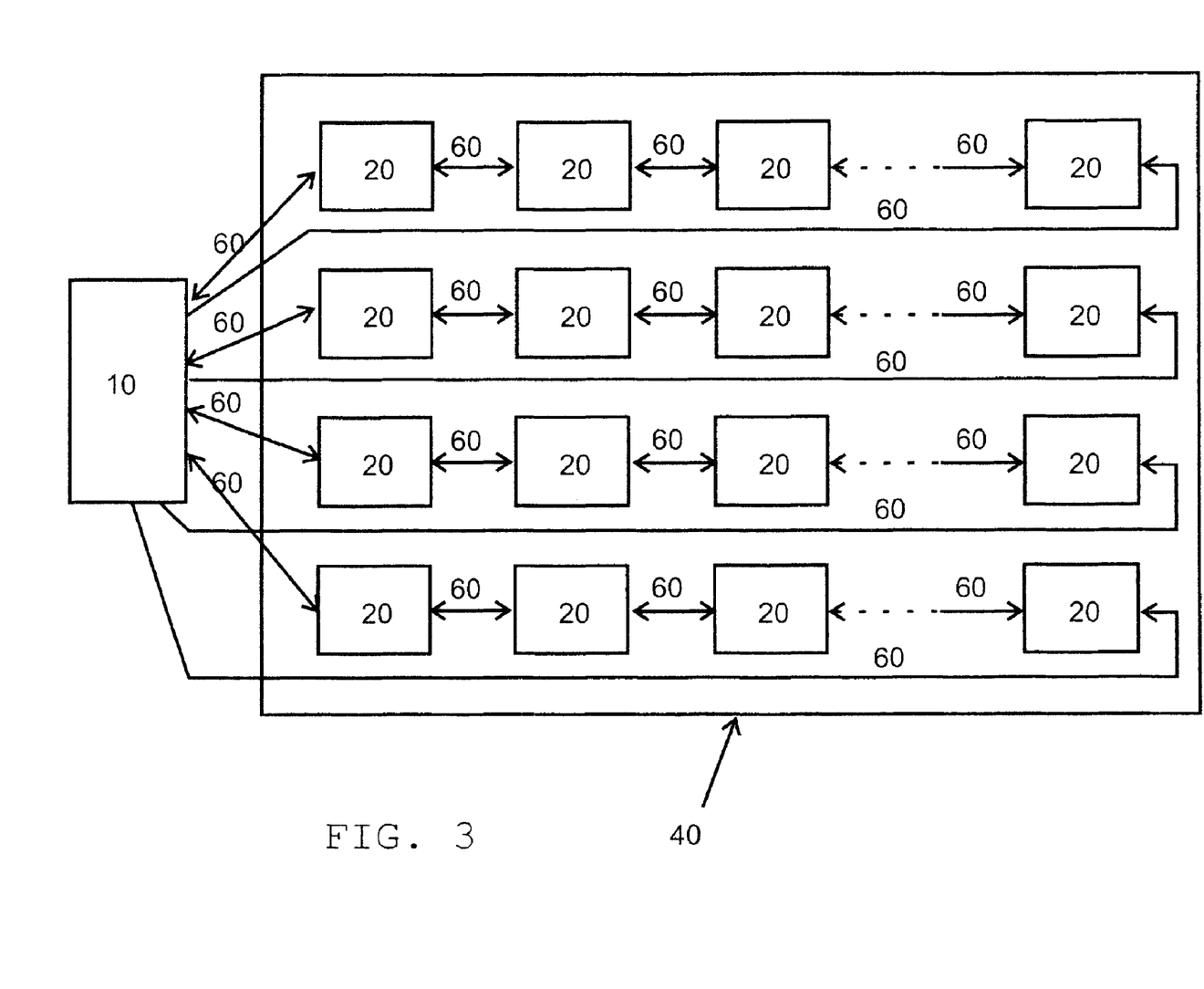
FIG. 3 is a schematic signal routing diagram for the present arrangement with redundant data paths.

The present invention provides apparatus and methods for a redundant signal for graphical displays. The concept developed uses a plurality of independent or redundant data paths, containing identical graphical data, but running on a physically separate medium. The redundant signals could be run within the same cable, but on separate conductors, or on a completely independent cable, or via other independent means such as using one or more wireless transmissions, electrical wiring, optical cabling, and so forth. The plurality of redundant data paths can be equivalent, with no particular priority, or one data path can be a primary path, with other(s) being secondary and utilized only when the primary path was not operating properly. The plurality of redundant signals can be transmitted in the same direction (essentially in parallel), or in another configuration such as in the reverse direction (essentially connecting the same display modules in series but in the reverse order) or in other configuration (such as a column vs. row order, etc.). One example of a configuration using redundant data paths is illustrated in FIG. 3, in which reverse direction data paths are used. In this example, the same physical cables can be used to connect display modules or panels 20 in series, but some conductors in the cable transfer data in one direction, while other conductors in the cable transfer data in the reverse direction, utilizing bidirectional data transmission, with both ends of the cable being connected to the control unit or data distributor 10. In the event of an equipment malfunction or cable failure that prevents the primary signal from reaching any module or panel, the module or panel will switch to one of the redundant signals to prevent information from being lost. The display control software would receive a message of the error, yet those watching the images would be oblivious to the signal failure, as FIG. 4 demonstrates.

Figure 4:
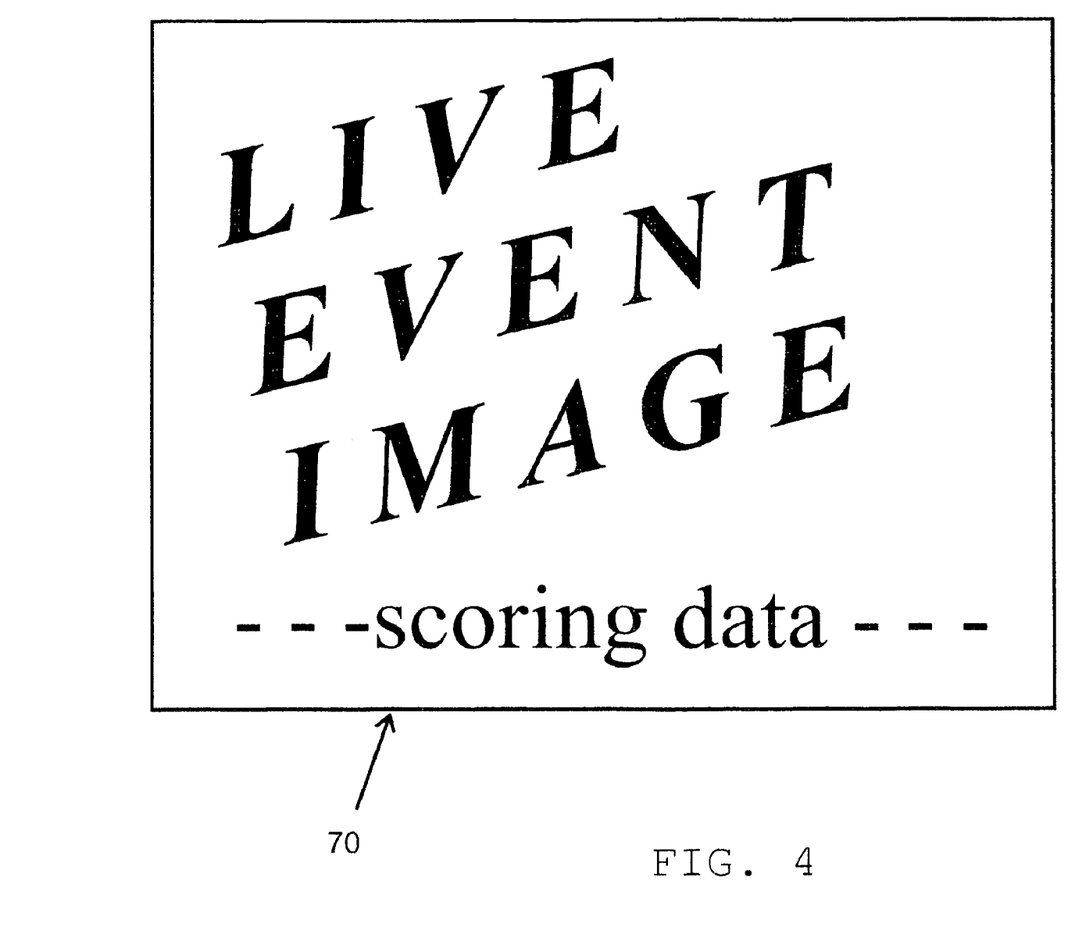
FIG. 4 is a display with the present arrangement with redundant data paths, with a signal failure.

In FIG. 4, the graphical image has no defect, even though a failure may have occurred in one data path, because data from another data path is used for display on the affected modules. Other configurations are possible, still in consistent with the present invention, such as multiple sets of conductors in the same cables. In this alternative, the configuration is similar to that shown in FIG. 1, except that each of the unidirectional data paths 30 actually comprises redundant data paths since the same graphical data is transmitted on a plurality of sets of conductors. In another alternative, separate cables can be used, but wired in parallel with those shown in FIG. 1, so that, again, if one data path has a problem, another data path (for example via the aforementioned parallel cables) transmits the required graphical data. Again, the appearance in the fault condition is that illustrated in FIG. 4, which has a normal appearance. Other data path configurations are possible, and as long as the redundant data paths are utilized, the appearance is normal even if a single data path had a fault condition.

Figure 5:
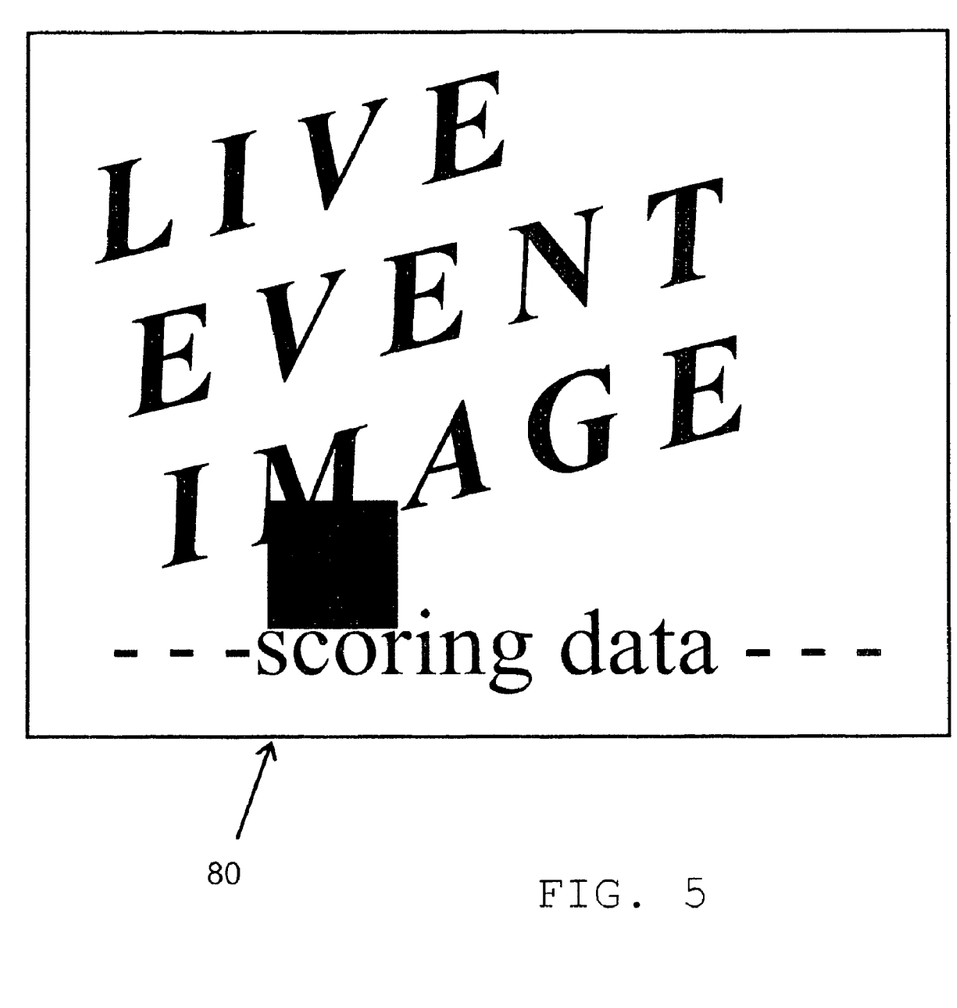
FIG. 5 is a display with the present arrangement with redundant data paths, with a power outage in one module.

The redundant data path also addresses power failures by helping to minimize the effect of such failures. If the power in a module would go down, the signal may not be able to be transmitted through the module with failed power and be received by the next module. Although the particular module would appear blank, the others would not be affected (illustrated in FIG. 5). This results in much less significant disruption of graphical display than the conventional situation, which would result in a larger portion of the display being blank as in FIG. 2. To correct the problem, the technician would then know that either it was a power failure or an error in the module itself and would then replace the individual module. The redundant data path, therefore, eliminates a step in troubleshooting displays for those that service the product.

Figure 6:
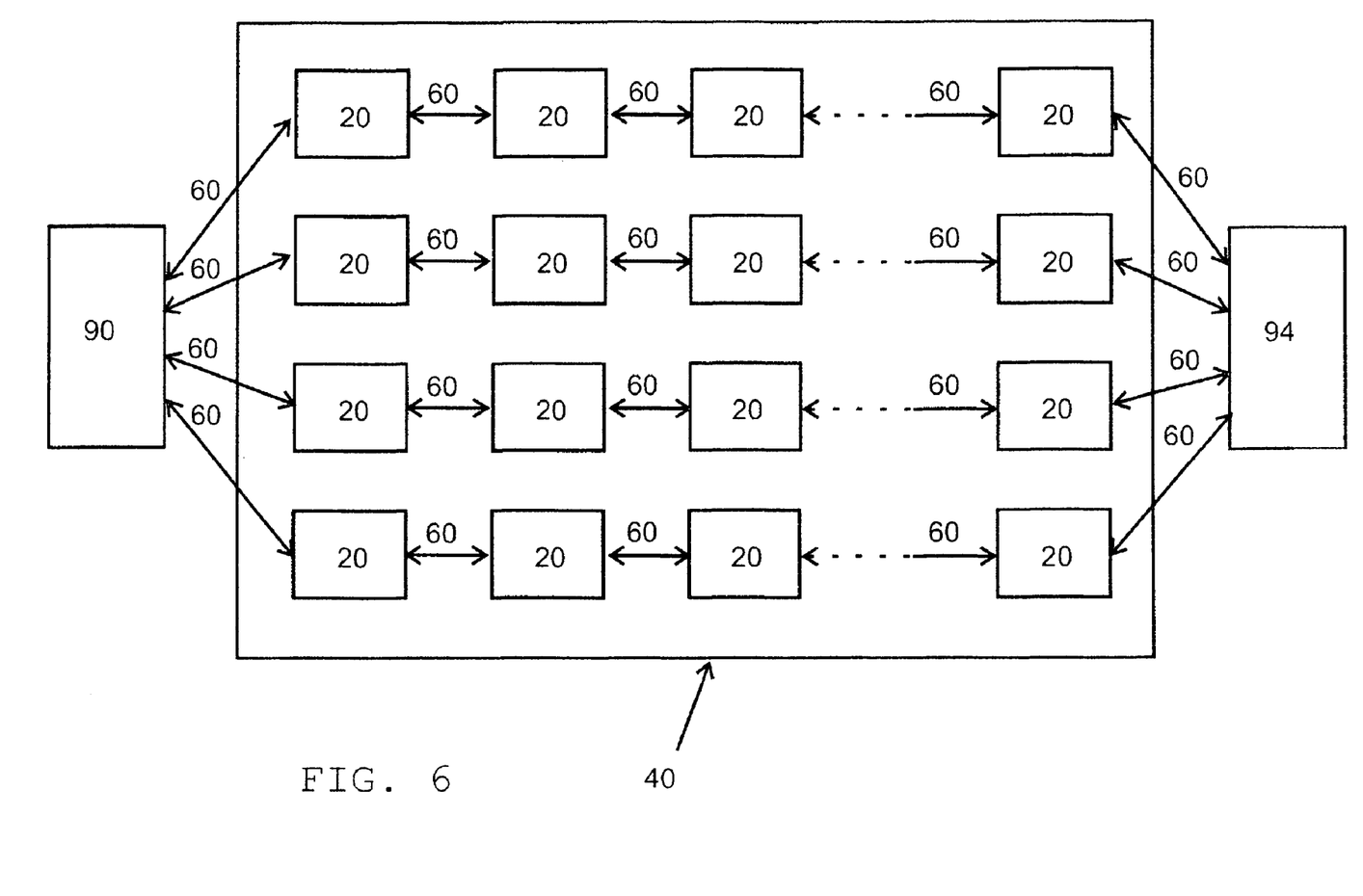
FIG. 6 is a schematic signal routing diagram for the present arrangement with redundant data paths from multiple control units; and, FIG. 7 is a schematic diagram showing error detection and switch stream decision for redundant data paths.

Finally, the information sent through the signal cables can be generated by multiple controller units. For example, one control unit may generate the primary signal while a completely different control unit will generate a redundant signal. If one control unit fails, a large section of a display may lose signal from that control unit, but the modules or panels will simply switch over and use the redundant data provided by other control units. FIG. 6 illustrates this arrangement, with display modules or panels 20 supplied from both control unit 90 and control unit 94 via redundant data paths 60. The redundant data paths can coexist in the same cable, as suggested in FIG. 6, or in separate cables or wireless transmissions as previously described. In a signal or power fault situation, the appearance would be as indicated in FIG. 4 for a signal failure, or as in FIG. 5 for a power failure in a particular module, much improved over the significant display defects of conventional arrangements as indicated in FIG. 2.

In this fashion, the inventive redundant data path can be used throughout a display system, from the control computer to the various control units to the modules or panels.

In the various embodiments, a particular data path can be a primary data path, with others being secondary or backup data paths. Alternatively, the plurality of data paths can be essentially equivalent, with switching between them as needed, including to provide for maintenance of the display system. Similarly one control unit or computer or a set of control units can be considered primary, with others being secondary or backup data paths, or the various control units (or sets) can be essentially equivalent, with switching between them as needed, including to provide for maintenance of the display system.

The redundant data path provides much needed advantages to electronic displays. Some of which are:
1. aximizing existing equipment and minimizing cost by using standard cabling, such as CAT-5 cable wires typically used in such systems;
2. less down time for displays, enabling the show to go on seamlessly, even when problems do occur; and,
3. increased security and system reliability from having redundant signals being sent to all control units, modules, and panels.

The present invention has general utility for graphical display systems, but the temporary graphical display or rental and staging industries have greatest need for a redundant data path. When an event such as a concert is going on in an arena, any visible display disruption can cause a major problem, with limited tolerance and time for correcting the failure. Without this invention, if a module fails during a concert, a technician with little training in the particular equipment being used, or an untrained roadee, must attempt to diagnose the problem by checking the signal to each of the modules in question, as well as the power to each of the modules. After discovering which module was actually bad, or which data transmission cable was defective, they would then have to quickly remove it and replace with a spare module or cable, if available. This process can take time, time that is not available during a concert or other event.

With the redundant signal path, if one module would go blank, the remainder would continue to function properly, with only a minimal disruption to the display. The technician or roadee would then check the power and if the power supply worked correctly, he would quickly switch out the single defective module, enabling the show to go as seamlessly as possible. Even such a module change would have minimal effect on the remainder of the display, since the redundant data path would supply other modules adjacent to the one being replaced, even during the replacement procedure.

Figure 7:
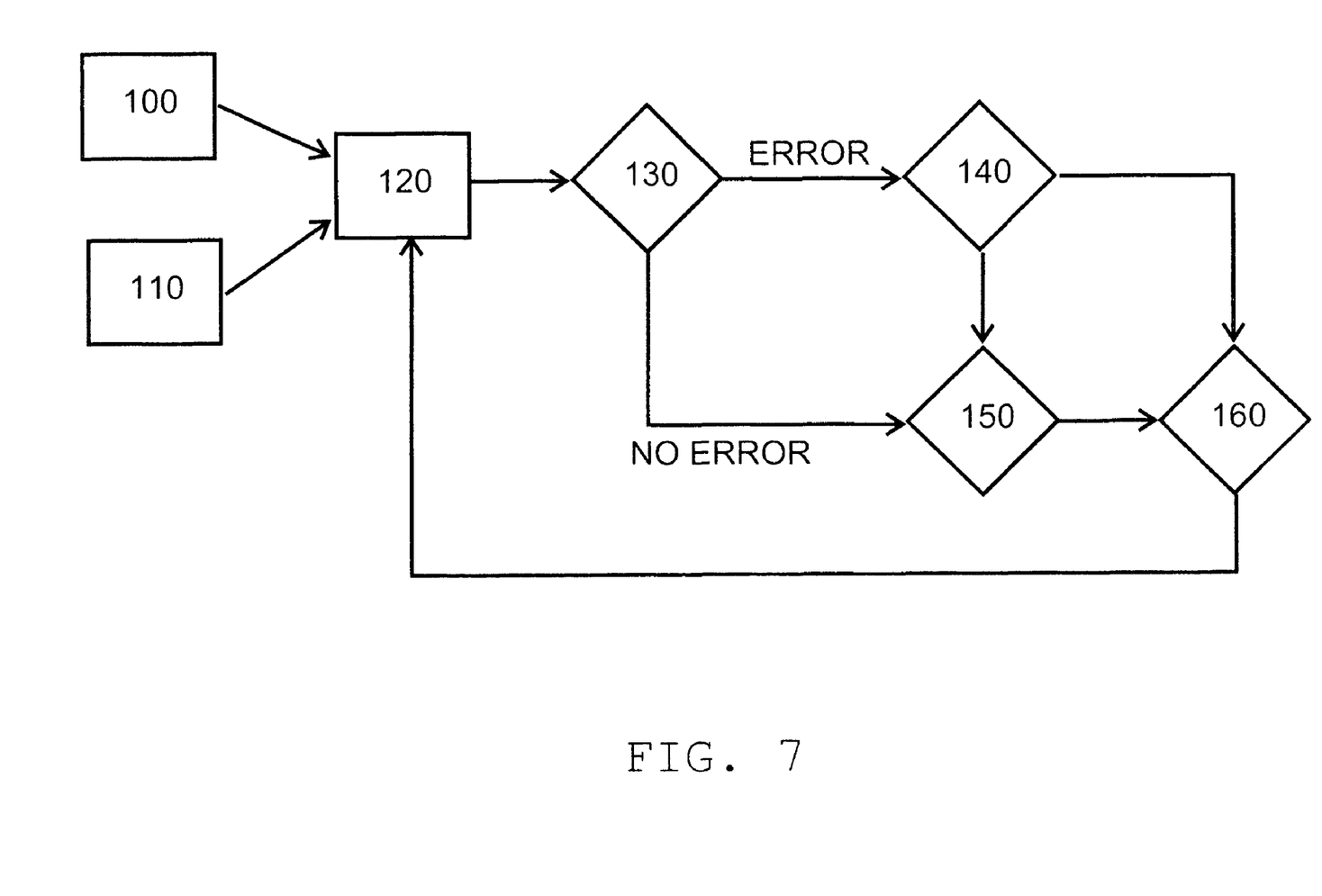

The invention also includes diagnostic data, apparatus, and methods for switching between data paths, to enable the display(s), module(s), panel(s), or control unit(s) to take advantage of the redundant data paths herein disclosed. FIG. 7 illustrates schematically a simplified example of how such apparatus and method is structured and utilized. In this example, two streams of graphical data are illustrated. Graphical data via data path 100 and graphical data via data path 110 are essentially identical graphical data via redundant data paths. Indicated at 120, either the graphical data via data path 100 or graphical data via data path 110 are selected for use by the display, module, or other component of the system. While the graphical data is being displayed or otherwise processed, the graphical data is checked for errors at 130, by using data counting, persistence of data, checksums, or other means. If an error is detected, error characterization is performed at 140, such as to determine whether there is loss of signal, loss of signal updating, or other erroneous data in the data stream. If there is a signal or data stream loss, a decision is made (at 160) to switch to the alternate data stream (via 100 or 110, whichever is not currently being used). If there is no signal or data stream loss, but there are other errors such as bad check data or nonsensical data in the graphical data, error counting 150 is used to increment the number of errors counted. If the error count exceeds a predetermined number of errors in a particular time interval, a decision is made (at 160) to switch to the alternate data stream (via 100 or 110, whichever is not currently being used). The switch stream decision from 160 is used at 120, to select either the graphical data via data path 100 or graphical data via data path 110 for use by the display, module, or other component of the system. This monitoring of graphical data from the redundant data paths is performed continuously or at regular intervals to check the integrity of the graphical data being used for display and to switch to other data paths as needed. If errors are detected, diagnostic data can be sent to a control unit or other component, or stored in memory, to facilitate maintenance of the system.

MODE OF OPERATION

In a graphical display system, graphical data is sent to displays, modules, or panels along a plurality of data paths. The redundant data paths provide graphical data to each display, module, or panel from at least 2 paths. If one path were interrupted due to failure in a cable, module, or other component, graphical data transmitted via a redundant data path is used to supply the display, modules, or panels with graphical data for display. The redundant data paths can be additional conductors in a cable, additional cables, or wireless transmissions, and can be routed parallel, in reverse direction (thereby using bidirectional data flow in a cable) or other routing. The redundant data path(s) provide for enhanced maintenance and repair functions for the display system, and provided improved function during a fault or failure situation. Display modules or components switch between graphical data from redundant data path(s) as needed to provide optimal graphical data display.

Various modifications can be made to the present invention without departing from the apparent scope thereof.

REDUNDANT DATA PATH PARTS LIST 10 control unit or data distributor
20 display modules or panels
30 unidirectional data paths
40 display
50 defective or blank portion of display
60 redundant data paths
70 display
80 display
90 control unit
94 control unit
100 graphical data via data path
110 graphical data via data path
120 selected graphical data from 100 or 110
130 error check
140 error characterization
150 error counting
160 switch stream decision It is claimed:

1. A graphical display apparatus, comprising:
    at least two display modules connected in series and not connected in parallel, the at least two display modules arranged to form a larger graphical display;
    a plurality of independent data paths, connected to each of the at least two display modules, allowing graphical data carried by each of the plurality of independent data paths to be transmitted to each of the at least two displays modules; and
    one or both of data path diagnostics, for detecting a failure in transmission of graphical data along one of the plurality of independent data paths, or an apparatus for switching between the plurality of independent data paths, so that if a failure in transmission of graphical data along one of the plurality of independent data paths occurs, graphical data supplied by transmission along another of the plurality of independent data paths is utilized for display on the larger graphical display.

2. The graphical display apparatus of claim 1, wherein the at least two display modules form a first row or column of two or more serially connected display modules, each module connected to the plurality of independent data paths configured to transmit graphical data from a control unit.

3. The graphical display apparatus of claim 1, wherein graphical data is passed from at least one of the at least two display modules to at least one other of the display modules, and
    wherein the plurality of independent data paths comprise bidirectional data paths allowing each of the at least two display modules to receive graphical data from a plurality of data paths.

4. The graphical display apparatus of claim 1, wherein the apparatus for switching between the plurality of independent data paths switches between the data paths to allow seamless display of graphical data despite the failure.

5. The graphical display apparatus of claim 2, wherein the at least two display modules further form a second row or column of two or more serially connected display modules, each module connected to the plurality of independent data paths configured to transmit graphical data from the control unit.

6. The graphical display apparatus of claim 2, wherein the at least two display modules comprise at least three display modules, each module connected to the plurality of independent data paths configured to transmit graphical data from the control unit.

7. The graphical display apparatus of claim 1, wherein the plurality of independent data paths run within the same cable, but on separate conductors.

8. The graphical display apparatus of claim 1, wherein the plurality of independent data paths use one or more wireless transmissions.

9. The graphical display apparatus of claim 1, wherein the plurality of independent data paths originate from a single control unit.

10. The graphical display apparatus of claim 1, wherein the plurality of independent data paths originate from at least two control units.

11. A method for transmission of graphical data for a graphical display apparatus, comprising the steps of:
    connecting a plurality of redundant data paths to each of two or more display modules that are connected in series and not connected in parallel, the two or more display modules arranged to form a graphical display larger in size than the individual display modules;
    transmitting graphical data along the plurality of redundant data paths; and
    switching between the plurality of redundant data paths to provide substantially seamless display of graphical data.

12. The method of claim 11, wherein transmitting graphical data along the plurality of redundant data paths includes bidirectionally transmitting graphical data between the two or more display modules.

13. The method of claim 11, wherein connecting the plurality of redundant data paths includes connecting a plurality of redundant data paths to a first set of two or more display modules arranged in series and forming a first row or column of display modules; and
    connecting a plurality of redundant data paths to a second set of two or more display modules arranged in series and forming a second row or column of display modules.

14. The method of claim 11, wherein transmitting graphical data along the plurality of redundant data paths includes transmitting graphical data from a control unit along first and second distinct data paths to each of the two or more display modules.

15. The method of claim 14, wherein switching between the plurality of redundant data paths includes switching between the first and second distinct data paths upon detection of a failure in transmission of graphical data along one of the first or second data paths.

16. The method of claim 15, further comprising the steps of:
    detecting the failure in transmission of graphical data along the first or second data paths; and
    determining which of the first or second data paths should be utilized for transmission of redundant graphical data for the graphical display.

17. The method of claim 16, further comprising the step of:
    repairing or replacing one or more failed components at a time when display of graphical data is of secondary importance.

18. A graphical display apparatus, comprising:
    a plurality of display modules connected in series and arranged to form a larger graphical display;
    a plurality of independent data paths for transmission of graphical data to each of the plurality of display modules, wherein graphical data from the plurality of independent data paths is passed from an output of one of the plurality of display modules to an input of another of the display modules;

data path diagnostics for detecting a failure in transmission of graphical data along one of the plurality of independent data paths; and an apparatus for switching between the plurality of independent data paths, so that if a detected failure in transmission occurs, graphical data supplied by transmission along another of the plurality of independent data paths is utilized.

19. The graphical display apparatus of claim 18, wherein the plurality of independent data paths comprise bidirectional data paths, so that each of the plurality of display modules receives graphical data from a plurality of data paths.

* * * * *